United States Patent
Mills et al.

(10) Patent No.: US 10,158,633 B2
(45) Date of Patent: Dec. 18, 2018

(54) USING THE ABILITY TO SPEAK AS A HUMAN INTERACTIVE PROOF

(71) Applicant: Microsoft Technology Licensing, LLC, Redmond, WA (US)

(72) Inventors: Chad Mills, Bellevue, WA (US); Robert Sim, Bellevue, WA (US); Scott Laufer, North Bend, WA (US); Sung Chung, Lake Forest Park, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/207,482

(22) Filed: Jul. 11, 2016

(65) Prior Publication Data

US 2017/0134376 A1     May 11, 2017

Related U.S. Application Data

(63) Continuation of application No. 13/564,722, filed on Aug. 2, 2012, now Pat. No. 9,390,245.

(51) Int. Cl.
*H04L 29/06* (2006.01)
*G10L 17/08* (2013.01)
(Continued)

(52) U.S. Cl.
CPC .......... *H04L 63/0861* (2013.01); *G06F 21/32* (2013.01); *G06Q 20/40145* (2013.01);
(Continued)

(58) Field of Classification Search
CPC . G06F 21/32; G06F 2221/2133; G10L 17/24; G06Q 20/40145; H04L 63/0861
See application file for complete search history.

(56) References Cited

U.S. PATENT DOCUMENTS

| | | | |
|---|---|---|---|
| 5,960,399 A | 9/1999 | Barclay et al. | |
| 6,266,640 B1 * | 7/2001 | Fromm ................. | G06Q 20/40 235/380 |

(Continued)

FOREIGN PATENT DOCUMENTS

| | | |
|---|---|---|
| JP | S63106798 A | 5/1988 |
| JP | 2000132515 A | 5/2000 |

(Continued)

OTHER PUBLICATIONS

"Office Action Issued in Japanese Patent Application No. 2015-525572", dated Sep. 6, 2017, 23 Pages.

(Continued)

*Primary Examiner* — Brian L Albertalli
(74) *Attorney, Agent, or Firm* — Alleman Hall Creasman & Tuttle LLP

(57) ABSTRACT

In one embodiment, a human interactive proof portal 140 may use a biometric input to determine whether a user is a standard user or a malicious actor. The human interactive proof portal 140 may receive an access request 302 for an online data service 122 from a user device 110. The human interactive proof portal 140 may send a proof challenge 304 to the user device 110 for presentation to a user. The human interactive proof portal 140 may receive from the user device 110 a proof response 306 having a biometric metadata description 430 based on a biometric input from the user.

20 Claims, 9 Drawing Sheets

| HIP PORTAL ADDRESS 410 | RESPONSE REPRESENTATION 420 | BIOMETRIC METADATA 430 | | | | SIGNATURE 440 | DEVICE ADDRESS 450 |
|---|---|---|---|---|---|---|---|
| | | VOICE PRINT 432 | LEVEL 434 | TONE 436 | SPEED 438 | | |

*400*

(51) Int. Cl.
*G10L 17/24* (2013.01)
*G06Q 20/40* (2012.01)
*G06F 21/32* (2013.01)

(52) U.S. Cl.
CPC .............. *G10L 17/08* (2013.01); *G10L 17/24* (2013.01); *H04L 63/10* (2013.01); *G06F 2221/2133* (2013.01)

(56) References Cited

U.S. PATENT DOCUMENTS

| | | | |
|---|---|---|---|
| 6,618,806 | B1 | 9/2003 | Brown et al. |
| 6,681,205 | B1* | 1/2004 | San Martin ............. G10L 17/24 704/243 |
| 8,036,902 | B1 | 10/2011 | Strom et al. |
| 8,224,655 | B2 | 7/2012 | Strom et al. |
| 8,380,503 | B2 | 2/2013 | Gross |
| 9,092,606 | B2 | 7/2015 | Hicks et al. |
| 9,165,216 | B2 | 10/2015 | Angell et al. |
| 2003/0014247 | A1* | 1/2003 | Ng .......................... G10L 17/06 704/209 |
| 2003/0037004 | A1 | 2/2003 | Buffum et al. |
| 2004/0199469 | A1 | 10/2004 | Barillova et al. |
| 2006/0047766 | A1 | 3/2006 | Spadea, III |
| 2009/0055193 | A1 | 2/2009 | Maislos et al. |
| 2009/0183247 | A1 | 7/2009 | Kasper et al. |
| 2009/0187405 | A1* | 7/2009 | Bhogal ................... G10L 17/00 704/246 |
| 2009/0309698 | A1 | 12/2009 | Headley et al. |
| 2009/0319210 | A1 | 12/2009 | Yanagisawa |
| 2009/0319270 | A1 | 12/2009 | Gross |
| 2009/0319271 | A1 | 12/2009 | Gross |
| 2010/0031330 | A1 | 2/2010 | Von Ahn et al. |
| 2010/0049526 | A1 | 2/2010 | Lewis et al. |
| 2010/0076770 | A1* | 3/2010 | Ramaswamy .......... G10L 17/06 704/273 |
| 2010/0313028 | A1 | 12/2010 | Li |
| 2011/0029371 | A1 | 2/2011 | Devries |
| 2011/0035505 | A1 | 2/2011 | Jakobsson |
| 2011/0320201 | A1* | 12/2011 | Kaufman ................ G10L 17/04 704/251 |
| 2012/0004914 | A1 | 1/2012 | Strom et al. |
| 2012/0054842 | A1 | 3/2012 | Urios Rodriguez et al. |
| 2012/0232907 | A1 | 9/2012 | Ivey |
| 2013/0042311 | A1 | 2/2013 | Broder et al. |
| 2013/0347067 | A1 | 12/2013 | Li et al. |
| 2014/0002240 | A1 | 1/2014 | Marciniak |

FOREIGN PATENT DOCUMENTS

| | | |
|---|---|---|
| JP | 2001052125 A | 2/2001 |
| JP | 2002269050 A | 9/2002 |
| JP | 2003087860 A | 3/2003 |
| JP | 2003114617 A | 4/2003 |
| JP | 2004038848 A | 2/2004 |
| JP | 2004133119 A | 4/2004 |
| JP | 2006079595 A | 3/2006 |
| JP | 2006209270 A | 8/2006 |
| JP | 2006283383 A | 10/2006 |
| JP | 2009175988 A | 8/2009 |
| JP | 2011100268 A | 5/2011 |
| WO | 2010150019 A1 | 12/2010 |
| WO | 2011122522 A1 | 10/2011 |

OTHER PUBLICATIONS

"Final Office Action Issued in U.S. Appl. No. 13/564,722", dated Mar. 5, 2015, 15 Pages.
"Non-Final Office Action Issued in U.S. Appl. No. 13/564,722", dated Apr. 24, 2014, 12 Pages.
"Non-Final Office Action Issued in U.S. Appl. No. 13/564,722", dated Aug. 20, 2015, 16 Pages.
"Supplemental Notice of Allowability Issued in U.S. Appl. No. 13/564,722", dated Mar. 28, 2016, 4 Pages.
"Notice of Allowance Issued in U.S. Appl. No. 13/564,722", dated Mar. 11, 2016, 9 Pages.
Goodrich, et al., "Loud and Clear: Human-verifiable authentication based on audio", In Proceedings of 26th IEEE International Conference on Distributed Computing Systems, Jul. 4, 2006, 8 Pages.
May, Matt, "Inaccessibility of CAPTCHA. Alternatives to visual Turing tests on the Web", Retrieved From <<http://www.w3.org/TR/turingtest/>>, Nov. 23, 2005, 10 Pages.
"International Search Report and Written Opinion Issued in PCT Application No. PCT/US2013/053107", dated Jan. 29, 2014, 10 Pages.
Yalamanchili, et al., "DevaCAPTCHA—A Framework to Prevent Bot Attacks", In Proceedings of Conference on Computer Science, Jul. 17, 2011, 8 Pages.
"First Office Action and Search Report Issued in Chinese Patent Application No. 201380040948.3", dated Oct. 9, 2016, 14 Pages.
"Second Office Action Issued in Chinese Patent Application No. 201380040948.3", dated Apr. 5, 2017, 7 Pages.
"Office Action Issued in European Patent Application No. 13750202.7", dated Apr. 13, 2017, 5 Pages.
"Office Action Issued in Japanese Patent Application No. 2015-525572", dated Jan. 19, 2018, 23 Pages.
Yoshii, Sadaoki, "Speaker Recognition Technique Using Designated Text", in Computer Today, vol. 11, Issue 1, Jan. 1, 1994, 11 Pages.
"Office Action Issued in Japanese Patent Application No. 2015-525572", dated Jun. 19, 2018, 16 Pages.

* cited by examiner

*300*

USING THE ABILITY TO SPEAK AS A HUMAN INTERACTIVE PROOF

BACKGROUND

This application claims the benefit of U.S. Non-Provisional Application Ser. No. 13/564,722 filed Aug. 2, 2012, which is incorporated herein by reference in its entirety.

A data service may provide services for free on the internet. A malicious entity may take advantage of these services using software applications that pretend to be human users. The software applications may overtax the server for the data service, hijack the data service for nefarious use, or interrupt normal use of the data service. For example, the software applications may set up fake free e-mail accounts to send out spam, hoard sale products for nefarious purposes, or may strip mine a public database.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to using a biometric input to determine whether a user is a standard user or a malicious actor. The human interactive proof portal may receive an access request for an online data service from a user device. The human interactive proof portal may send a proof challenge to the user device for presentation to a user. The human interactive proof portal may receive from the user device a proof response having a biometric metadata description based on a biometric input from the user.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
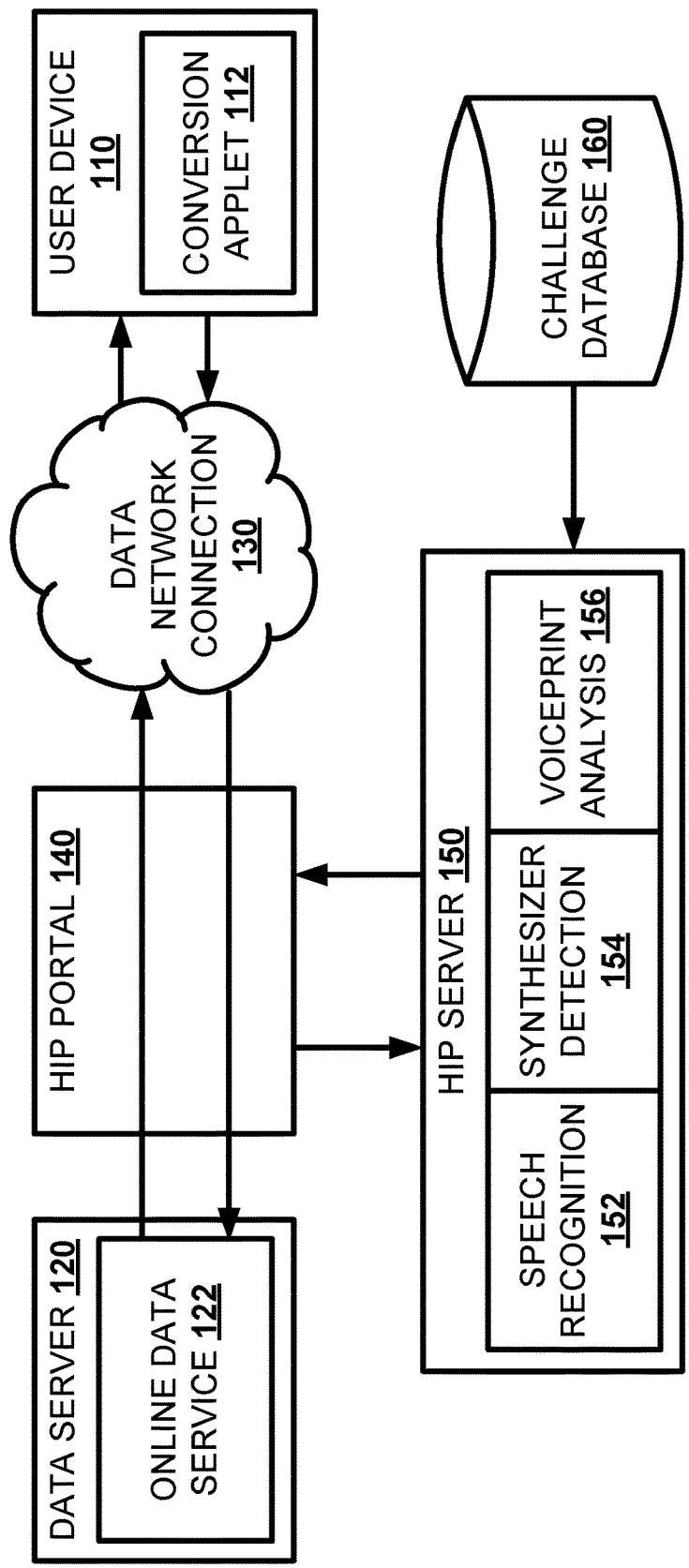
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible computer-readable storage medium having a set of instructions detailing a method stored thereon for at least one processor, or a human interactive proof portal.

A human interactive proof portal may guard access to an online data service by sending a proof challenge to a user device. A proof challenge is a set of text, a digital image, or a set of audio data that seek to elicit one of a set of one or more actions from a user to determine if the user is a malicious actor. A proof response is an attempt by the user to solve the proof challenge by performing an action as determined from the proof challenge. A proof challenge answer is an action by the user that correctly solves the proof challenge. The user device may receive a biometric input from a user to create a proof response to the proof challenge. A biometric input is a human produced input that identifies the user, such as a voice, a fingerprint, or a facial image. The human interactive proof portal may determine whether the user is a human user based upon the biometric input.

For example, a human interactive proof portal may select a proof challenge to be sent to the user to elicit an audio response from the user as a proof response. The proof challenge may be a set of text for the user to read or a puzzle for the user to solve, such as asking the user to say the sum of 124 and 53. The user may speak the text elicited by the proof challenge aloud into a microphone of a user device. The user device may record the audio input and send the audio input back to the human interactive proof portal. The human interactive proof portal may process the audio recording to validate that the user is a human. The human interactive proof portal may use speech recognition to verify the text was spoken correctly. The human interactive proof portal may use speech synthesizer detection to verify that the audio input was from a human rather than an automated system generating the response. The human interactive proof portal may create a voiceprint to verify that a single sweatshop user is not creating a large number of accounts. The human interactive proof portal may determine whether or not a user has successfully solved the human interactive proof. The audio recordings, along with the spoken text, may then be used for making better speech recognition and speech synthesis systems.

The human interactive proof portal may identify text as a proof challenge for the user to speak. The proof challenge may be text randomly chosen from public domain works, scientific literature, or any other corpus of text. The text may be selected to provide audio data that a speech recognition or voice synthesis system may have difficulty processing.

The human interactive proof portal may send the text as a proof challenge to the user. The text may be displayed in a control on a website, client application, television, or other display screen. Alternately, the text may be played as an audio file, speaking the chosen text. The human interactive proof portal may instruct the user to begin speaking the text. The recording of the text may be automatic or initiated by the user. For example, the user may click a button in order to have the text displayed and be expected to read the text immediately. Alternately, the proof challenge may be present upon access of the online data service, with the user starting reading whenever the user chooses.

The user device may transmit the recording of this audio data back to the human interactive proof portal. The user device may record the audio into a Moving Picture Experts Group-1 Audio Layer III format, or MP3, and send the recording back to the human interactive proof portal as a file. Alternatively, the user device may extract specified features, such as frequencies as a function of time or loudness as a function of time. The user device may send the specified features back to the human interactive proof portal to reduce the bandwidth usage or server computing time. The human interactive proof portal or the user device may generate the specified features, referred to as the biometric metadata description.

The human interactive proof portal may determine if the provided audio input or the biometric metadata description represents text spoken aloud by a human being. Further the human interactive proof portal may determine if the voice belongs to a user that is accessing excessive service capacity. The human interactive proof portal may determine if the user is a malicious actor by executing a voice verification in series, parallel, or some combination of the two.

The human interactive proof portal may determine that the speech utterance recorded in the proof response is a spoken version of the provided text in the proof challenge. Since the specific text being recognized is known to the system, a closed-domain speech recognition approach may greatly simplify the speech recognition component. The human interactive proof portal may be lenient toward accepting questionable utterances to avoid false positives, since additional verification may prevent abuse.

The human interactive proof portal may verify that the spoken text is human rather than the result of a speech synthesizer. The human interactive proof portal may use a classifier to make this verification. Synthesized speech may be very flat sounding, making the speech different enough from normal human speech that identification of the normal human speech from the sound alone is possible. A speech synthesizer may frequently have a human record each sound phoneme used in speaking a particular language. The speech synthesizer may translate the text into a sequence of phonemes. The speech synthesizer may concatenate the correspondingly recorded phonemes together, with some smoothing to prevent choppiness and distortions to the sound signal to add realism. The limited number of recorded sounds and the presence of this machine-generated smoothing may aid in the detection of synthesized speech.

In addition, the classifier may use the knowledge of existing speech synthesizer models. By comparing speech input against the expected output from known synthesizer models for the text to be verified, the classifier may detect the type of input source generated by one of known synthesizers. The database for synthesizer models may be updated as new models are found. The use of multiple classification schemes may increase the accuracy.

One way abusers may solve human interactive proofs is to hire sweatshops to solve the proof challenges manually. The human interactive proof portal may use voiceprints, even anonymous voiceprints, to track the frequency with which the same human solves a proof challenge. Human interactive proof may be used for creating an account and for throttling access to important service resources, causing the same user to get verified multiple times. However, abusers may typically operate on a much larger scale with many more proof responses to proof challenges. By limiting the number and frequency of verifications by the voiceprint to a number consistent with legitimate use of a service, the human interactive proof portal may identify sweatshop users.

A human interactive proof portal may protect against sweatshop-style attacks involving human speakers by associating a voiceprint with a user account. Such an association may be used by for proof challenges given after a user account is created. For account-specific human interactive proof sessions, the human interactive proof portal uses user speech input to build a user model characterizing a user voiceprint. The human interactive proof portal may enhance a user model by the aggregating input from multiple sessions. Simultaneously, the human interactive proof portal may use the user model to verify each human interactive proof input. If an input utterance does not fit the user model for the user account during verification, the human interactive proof portal may determine that the speaker fails the challenge. The database of user models may be used for other purposes, such as user authentication. The human interactive proof portal may augment the user model using speech input from other voice sources, such as voice messaging.

Additionally, the human interactive proof portal may execute a smoothness check, an audio database check, or a voiceprint consistency check to verify that multiple audio snippets from other sources are not being spliced together to generate a response. As new abusive techniques are invented, the human interactive proof portal may add additional checks to mitigate the abusive techniques or adjust the voice verification to account for the abusive techniques.

Once the human interactive proof portal has verified the user, the human interactive proof portal may determine whether the user is authorized to access an online data service or online data resources. The human interactive proof portal may limit the amount of resources consumed. The human interactive proof portal may verify the user if the proof response successfully solves the proof challenge. Alternately, the human interactive proof portal may apply a series of logical rules to the biometric metadata description. The human interactive proof portal may assign a confidence score to each aspect of the biometric metadata description. The human interactive proof portal may apply a machine learning classifier to each aspect and confidence score and predict whether or not the user is a human authorized to access the online data service.

Thus, in one embodiment, a human interactive proof portal may use a biometric input to determine whether a user is a standard user or a malicious actor. The human interactive proof portal may receive an access request for an online data service from a user device. The human interactive proof portal may send a proof challenge to the user device for presentation to a user. The human interactive proof portal may receive from the user device a proof response having a biometric metadata response description based on a biometric input from the user. The human interactive proof portal may analyze a biometric metadata description describing the biometric input to identify a human sweatshop.

FIG. 1 illustrates, in a block diagram, one embodiment of a data network 100. A user device 110 may connect to a data server 120 via a data network connection 130, such as the internet. The user device 110 may access an online data service 122 executed by the data server 120. The online data service 122 may protect access to the online data service 122 using a human interactive proof (HIP) portal 140. The human interactive proof portal 140 may be executed by the data server 120 or by a separate human interactive proof server 150.

The human interactive proof portal 140 may send one or more proof challenges provided by a proof challenge database 160 to the user device 110. The human interactive proof portal 140 may generate a proof challenge for presentation to a user. The proof challenge may seek a biometric input from the user as a proof response. A biometric input is a biologically produced input that identifies a human, such as speech, fingerprints, or an image of the user. The human interactive proof server 150 may then process the proof response to verify that the user is human. The human interactive proof portal 140 may further examine the proof response based on the biometric input from the user to determine whether the user is from a human sweatshop.

For an audio input from a user, the human interactive proof server 150 may compare the audio input to the proof challenge answer, while processing the biometric metadata description of the audio input to verify that the audio input is not computer generated or the product of a human sweatshop. The human interactive proof server 150 may convert the audio input to a text format, an audio format, or any intermediate format to determine a match with the proof challenge answer. The biometric metadata description may be generated from the audio input at the human interactive proof server 150. Alternatively, the human interactive proof portal may install a conversion applet 112, a small web-based application, on the user device 110 to generate the biometric metadata description. The conversion applet 112 may be used when network bandwidth may render sending audio files impractical.

The human interactive proof server 150 may have a speech recognition module 152 to convert the audio input into a text word or other intermediate format for comparison with the proof challenge answer. The human interactive input proof server 150 may have a synthesizer detection module 154 to verify that the audio input was produced by a human and not an audio synthesizer. The synthesizer detection module 154 may analyze the variance in tone, referred to as the flatness aspect, of the audio input and compare the audio input to known audio synthesizers. The human interactive input proof server 150 may have a voiceprint analysis module 156 to determine whether the same human is producing an audio input. The voiceprint analysis module 156 may determine whether an account has the same user each time and whether the same user is using multiple accounts, both of which may indicate a human sweatshop.

Figure 2:
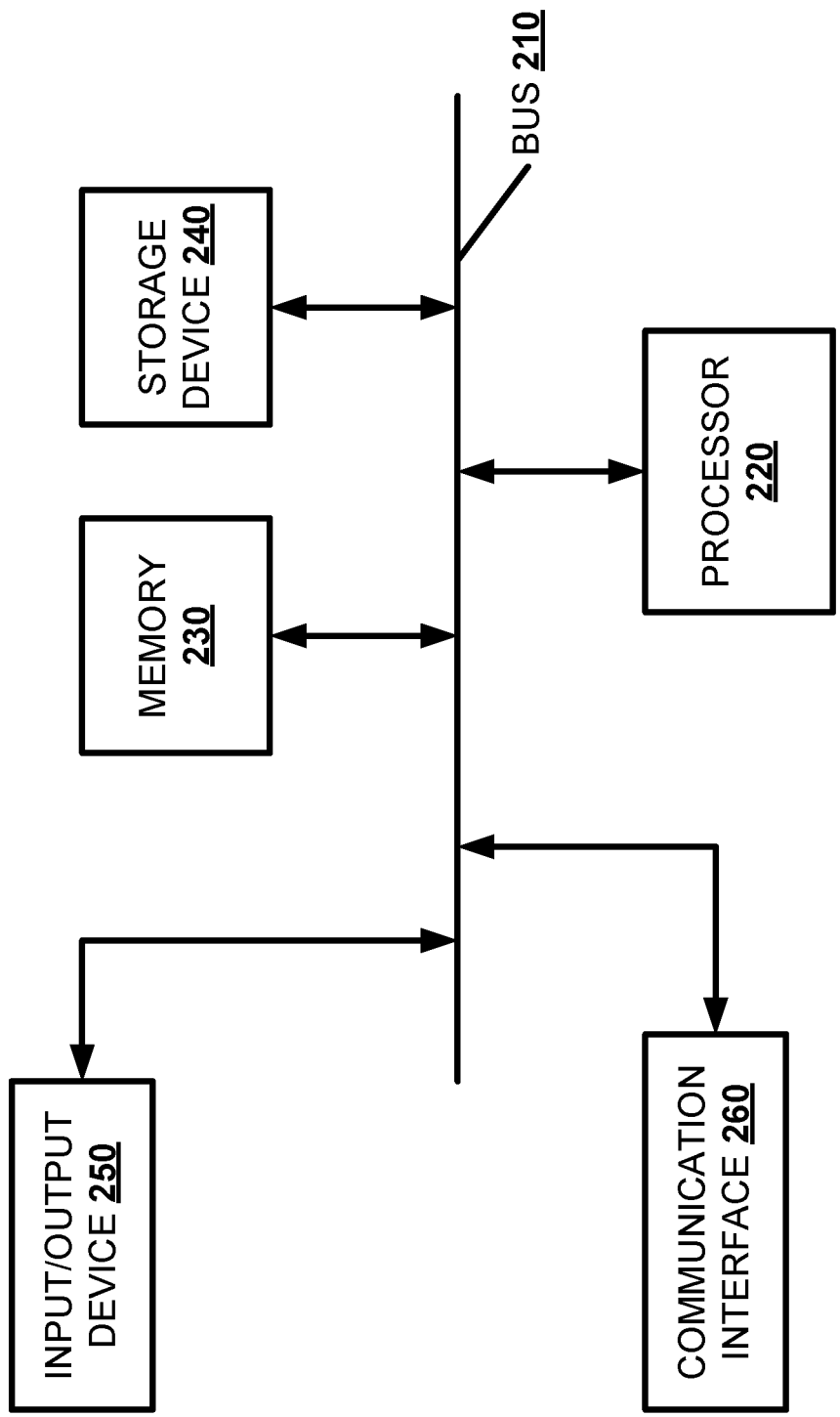
FIG. 2 illustrates, in a block diagram, one embodiment of a computing device.

FIG. 2 illustrates a block diagram of an exemplary computing device 200 which may act as a user device 110, a data server 120, or a human interactive proof server 150. The computing device 200 may combine one or more of hardware, software, firmware, and system-on-a-chip technology to implement a user device 110, a data server 120 or a human interactive proof server 150. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220.

The data storage 240 may include a conventional ROM device or another type of static data storage that stores static information and instructions for the processor 220. The data storage 240 may include any type of tangible computer-readable storage medium, such as, for example, magnetic or optical recording media, such as a digital video disk, and its corresponding drive. A tangible computer-readable storage medium is a physical medium storing machine-readable code or instructions, as opposed to a signal. Having instructions stored on a computer-readable media as described herein is distinguishable from having instructions propagated or transmitted, as the propagation transfers the instructions, versus stores the instructions such as can occur with a computer-readable storage medium having instructions stored thereon. Therefore, unless otherwise noted, references to computer-readable media or medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing proof challenges.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to processor 220 executing sequences of instructions contained in a computer-readable storage medium, such as, for example, the memory 230, a magnetic disk, or an optical disk. Such instructions may be read into the memory 230 from another computer-readable storage medium, such as the data storage 240, or from a separate device via the communication interface 260.

Figure 3:
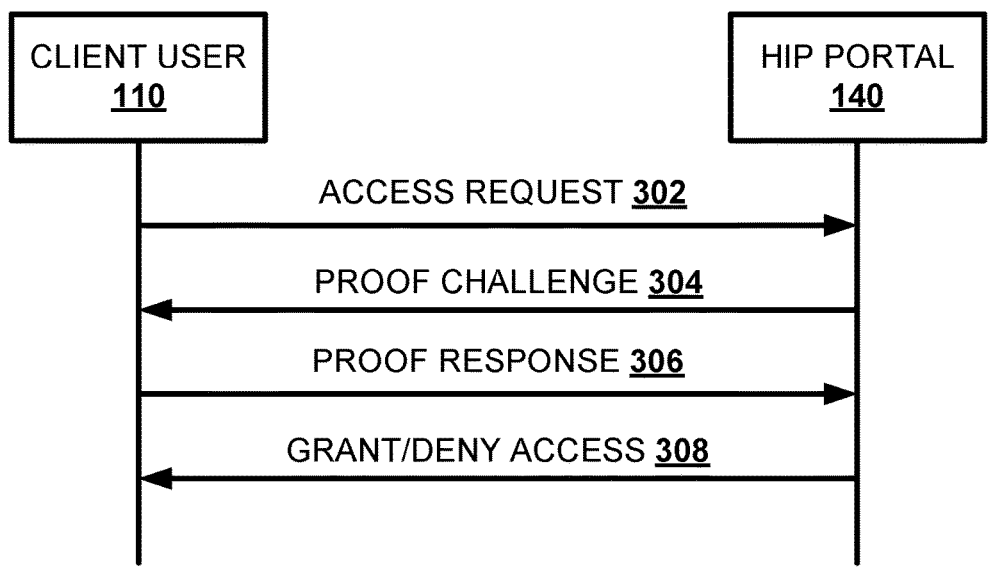
FIG. 3 illustrates, in a flow diagram, one embodiment of executing a biometric human interactive proof session.

FIG. 3 illustrates, in a flow diagram, one embodiment of executing a biometric human interactive proof session 300. The user device 110 may send an access request 302 to the human interactive proof portal 140. The human interactive proof portal 140 may return a proof challenge 304 to the user device 110. The proof challenge 304 may be a text segment or an audio word. The text segment may be a distorted text word, a text word altered to render the text word unreadable by optical character recognition. An audio word is an audio file that is played by the user device 110 for the user to hear. Alternately, the proof challenge may describe an action for the user to perform, such as applying a fingertip to a print reader or smiling for a digital image capture.

The user device 110 may provide a proof response 306 to the human interactive proof portal 140 to solve the proof challenge 304. The proof response 306 may be a biometric input, such as an audio input, a fingerprint, or a digital image capture of a face. An audio input may produce an audio file of the user saying a proof challenge word. A fingerprint or digital image capture may specifically identify the user, if privacy is not an issue. The human interactive proof portal 140 may further determine if the biometric metadata description indicates that the user is a malicious actor, such as a human sweatshop or a software application.

Bandwidth issues may significantly slowdown the user. A human interactive proof portal 140 may send a conversion applet 112 to the user device 110 to produce a metadata proof response from the audio input, so that the proof responses may use less bandwidth. While the metadata proof response produced by the conversion applet may conserve bandwidth, the metadata proof response may be less secure.

Figure 4:
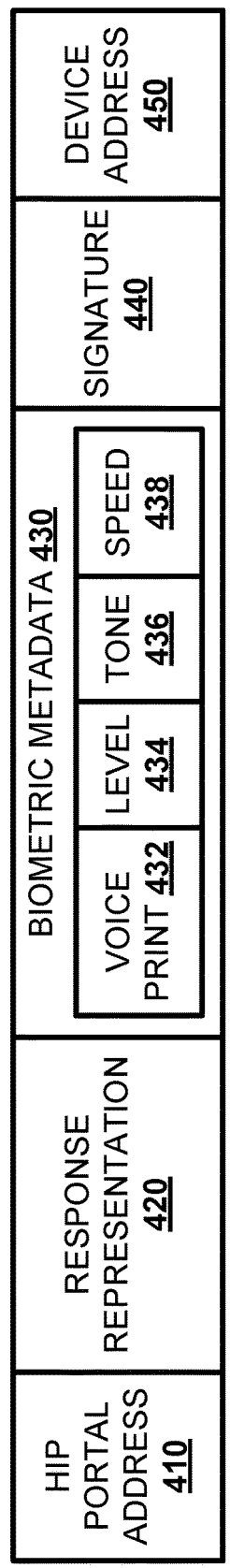
FIG. 4 illustrates, in a block diagram, one embodiment of a metadata proof response.

FIG. 4 illustrates, in a block diagram, one embodiment of a metadata proof response 400 for an audio input. A metadata proof response 400 may have a human interactive proof portal address 410 indicating the human interactive proof portal 140 receiving the metadata proof response 400. The metadata proof response 400 may have a response representation 420, such as a text word, an audio file, or other intermediate format representations generated from the audio input by a voice recognition module of the conversion applet 112. The metadata proof response may have a biometric metadata description 430 based on the biometric input from the user. The biometric metadata description 430 may have a voice print 432 generated from the audio input by the conversion applet 112. A voice print 432 may identify a user. The biometric metadata description 430 may have a level 434 generated from the audio input by the conversion applet 112. The level 434 describes the volume throughout the audio input. The biometric metadata description 430 may have a tone 436 generated from the audio input by the conversion applet 112. The tone 436 describes the frequency over time of the audio input. The biometric metadata description 430 may have a speed 438 generated from the audio input by the conversion applet 112. The speed 438 may describe the length of time used to create the audio input. The metadata proof response 400 may have a digital signature 440 appended to the metadata proof response 400 by the conversion applet 112. The digital signature 440 may indicate that the metadata proof response 400 comes from the conversion applet 112 and is not a spoofed response from a malicious actor. The metadata proof response 400 may have a device address 450, such as an Internet protocol address, to identify the user device 110 sending the metadata proof response 400. The metadata proof response 400 may have other data that aids in determining whether the user is a malicious actor, such as network reputation data, device reputation data, and other information that helps the human interactive proof portal 140 identify malicious actors.

Figure 5:
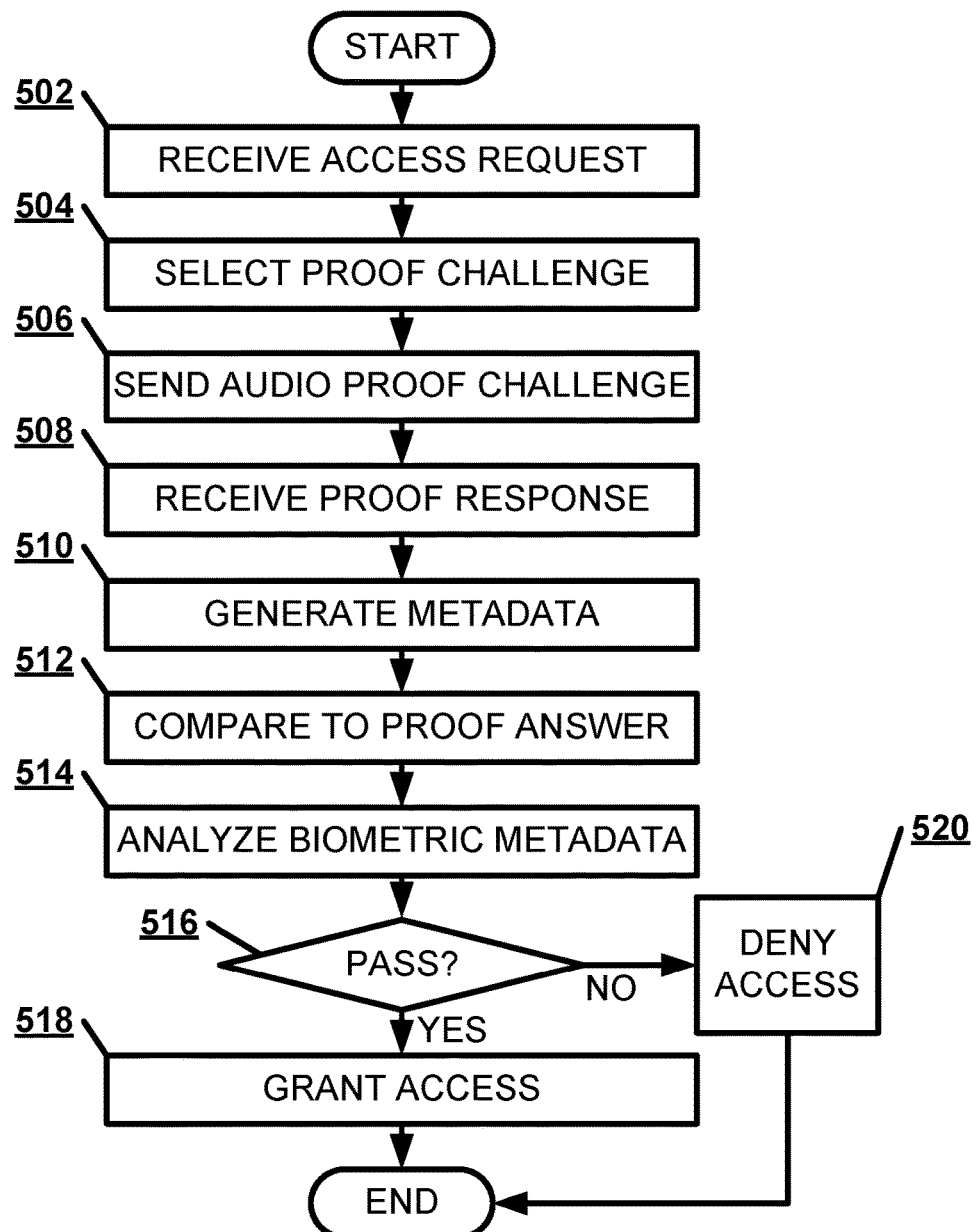
FIG. 5 illustrates, in a flowchart, one embodiment of a method for conducting a human interactive proof session with a human interactive proof portal.

The human interactive proof portal 140 may receive a biometric input as the proof response 306. FIG. 5 illustrates, in a flowchart, one embodiment of a method 500 for conducting a human interactive proof session 300 with a human interactive proof portal 140. The human interactive proof portal 140 may receive an access request 302 for an online data service 122 from a user device 110 (Block 502). The human interactive proof portal 140 may select a proof challenge 304 from a proof challenge database 160 (Block 504). The human interactive proof portal 140 may send a proof challenge 304 to the user device 110 for presentation to a user (Block 506). For example, the human interactive proof portal 140 may send an audio word as the proof challenge 304.

The human interactive proof portal 140 may receive from the user device 110 a proof response 306 based on a biometric input from the user (Block 508). The human interactive proof portal 140 may generate a biometric metadata description from the proof response 306 (Block 510). The human interactive proof portal 140 may compare the biometric input to a proof challenge answer (Block 512). The human interactive proof portal 140 may analyze a biometric metadata description describing the biometric input from the proof response 306 to identify a malicious actor, such as a human sweatshop (Block 514).

If the user has passed a proof challenge 304 without raising any flags (Block 516), the human interactive proof portal 140 may grant access 308 to a user account based on the biometric input (Block 518). If the user has not passed a proof challenge 304 without raising any flags (Block 516), the human interactive proof portal 140 may deny access 308 to the online data service 122 (Block 520).

Figure 6:
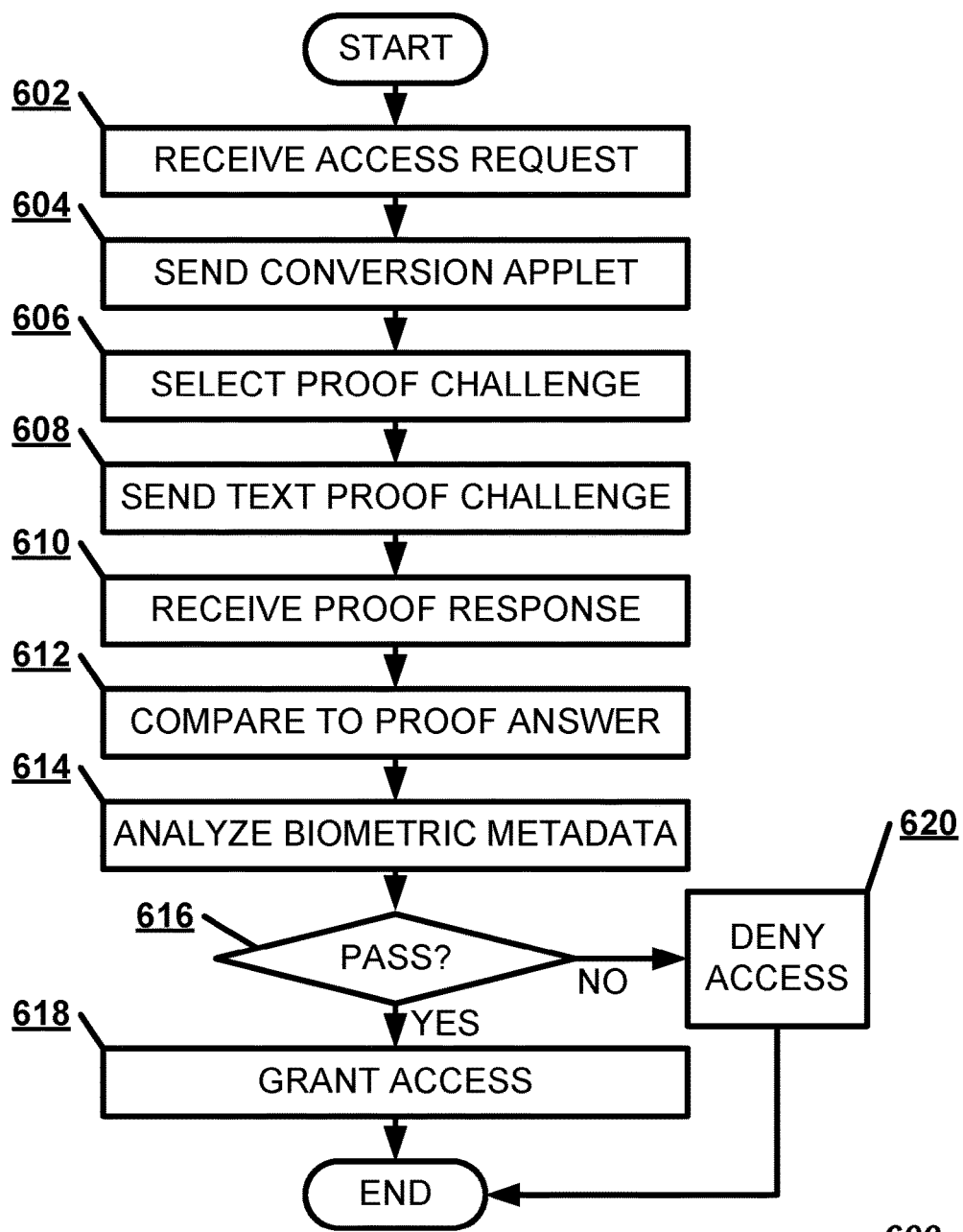
FIG. 6 illustrates, in a flowchart, one embodiment of a method for conducting a human interactive proof session with a human interactive proof portal having user side processing.

The human interactive proof portal 140 may use a description of the biometric input created by the user device 110 as the proof response 306. FIG. 6 illustrates, in a flowchart, one embodiment of a method 600 for conducting a human interactive proof session 300 with a human interactive proof portal 140 having user-side processing. The human interactive proof portal 140 may receive an access request 302 for an online data service 122 from a user device 110 (Block 602). The human interactive proof portal 140 may send a conversion applet 112 for installation by the user device 110 (Block 604). The human interactive proof portal 140 may select a proof challenge 304 from a proof challenge database 160 (Block 606). The human interactive proof portal 140 may send a proof challenge 304 to the user device 110 for presentation to a user (Block 608). For example, the human interactive proof portal 140 may send a text segment, such as a distorted text word, as the proof challenge 304.

The human interactive proof portal 140 may receive from the user device 110 a proof response 306 having a response representation and a biometric metadata description based on a biometric input from the user (Block 610). The human interactive proof portal 140 may compare the biometric input to a proof challenge answer (Block 612). The human interactive proof portal 140 may analyze a biometric metadata description describing the biometric input from the proof response 306 to identify a malicious actor, such as a human sweatshop (Block 614).

If the user has passed a proof challenge 304 without raising any flags (Block 618), the human interactive proof portal 140 may grant access 308 to a user account based on the biometric input (Block 620). If the user has not passed the proof challenge 304 without raising any flags (Block 618), the human interactive proof portal 140 may deny access 308 to the online data service 122 (Block 622).

Figure 7:
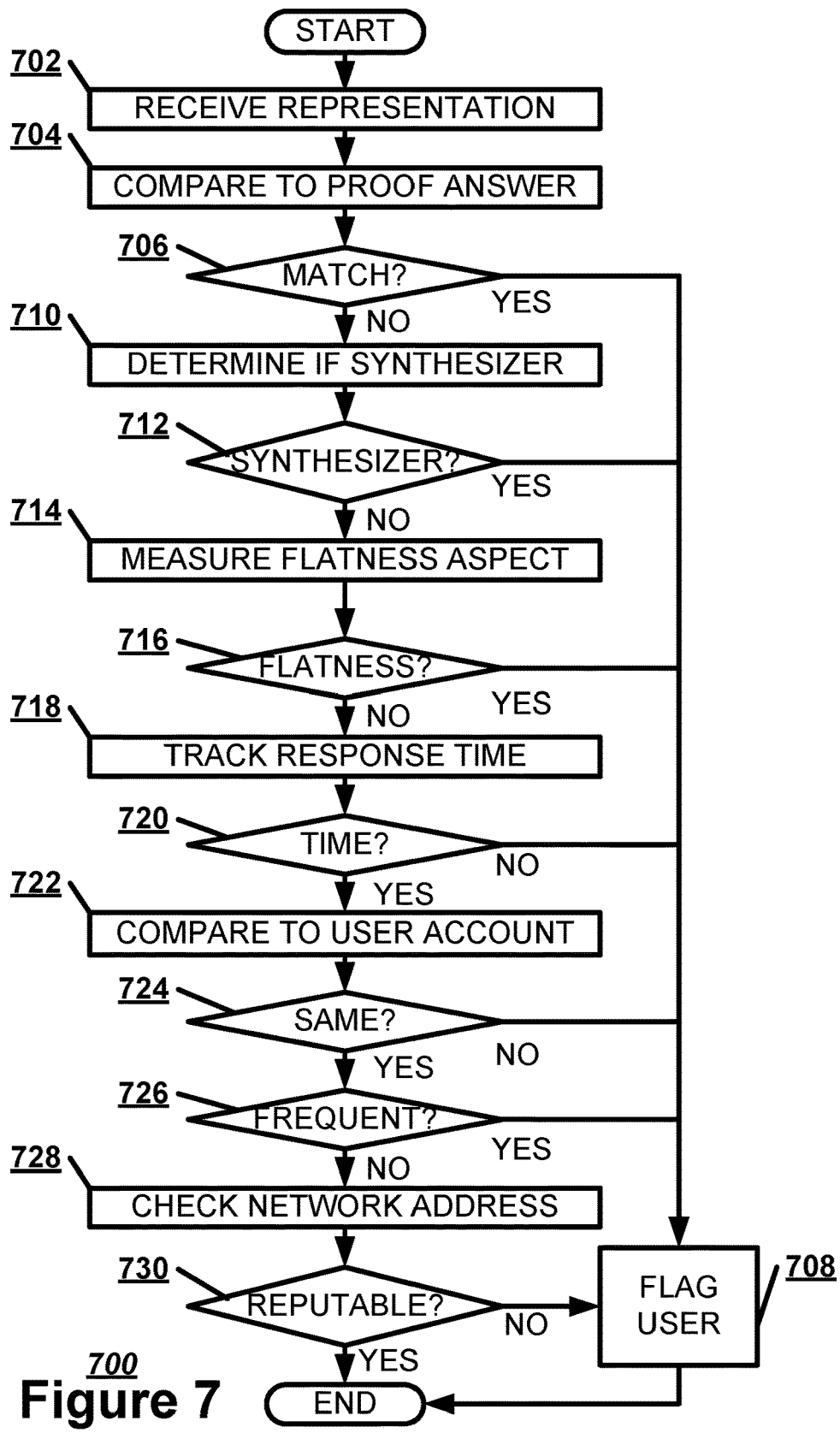
FIG. 7 illustrates, in a flowchart, one embodiment of a method for analyzing a biometric metadata description.

For an audio input as the biometric input, the human interactive proof portal 140 may examine the biometric metadata description, such as an audio metadata description, to determine if the user is a malicious actor. FIG. 7 illustrates, in a flowchart, one embodiment of a method 700 for analyzing a biometric metadata description for an audio input. The human interactive proof portal 140 may receive a response representation 420 based on an audio input (Block 702). The human interactive proof portal 140 may compare the audio input to a proof challenge answer (Block 704). If the audio input does not match the proof challenge answer (Block 706), the human interactive proof portal 140 may flag the user as a possible malicious actor (Block 708).

The human interactive proof portal 140 may determine if the audio input is from a speech synthesizer (Block 710). If the audio input shows signs of being from a speech synthesizer (Block 712), the human interactive proof portal 140 may flag the user as a possible malicious actor (Block 708). The human interactive proof portal 140 may measure a flatness aspect of the audio input (Block 714). The flatness aspect describes the variation in tone of an audio input. If the audio input is flatter than a specified flatness threshold (Block 716), the human interactive proof portal 140 may flag the user as a possible malicious actor (Block 708). The human interactive proof portal 140 may track a response time for the proof response 306 (Block 718). If the response time indicates a suspicious user, such as a user overly practiced at responding to proof challenges 304 or a proof challenge 304 that has been in a queue (Block 720), the human interactive proof portal 140 may flag the user as a possible malicious actor (Block 708).

The human interactive proof portal 140 may compare a voice print of the audio input to a user account profile (Block 722). If the human interactive proof portal identifies different users for a single user account (Block 724), the human interactive proof portal 140 may flag the user as a possible malicious actor (Block 708). The human interactive proof portal 140 may identify a user that has interactions with the human interactive proof portal above a frequent use threshold, indicating the user is responding for multiple user accounts. If the human interactive proof portal 140 identifies a voice print as belonging to a frequent user (Block 726), the human interactive proof portal 140 may flag the user as a possible malicious actor (Block 708). The human interactive proof portal 140 may check the network address for the user device, such as an internet protocol (IP) address (Block 728). If the human interactive proof portal determines that the user is not at a reputable network address (Block 730), the human interactive proof portal 140 may flag the user as a possible malicious actor (Block 708).

Figure 8:
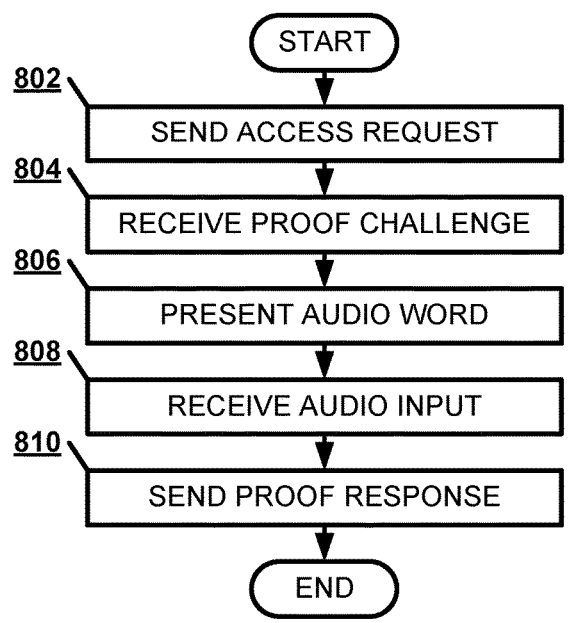
FIG. 8 illustrates, in a flowchart, one embodiment of a method for conducting a human interactive proof session with a user device.

The user device 110 may receive a biometric input, such as an audio input, from a user, and send the biometric input to the human interactive proof portal 140. FIG. 8 illustrates, in a flowchart, one embodiment of a method 800 for conducting a human interactive proof session 300 with a user device 110. The user device 110 may send an access request 302 for an online data service 120 to a human interactive proof portal 140 (Block 802). The user device 110 may receive a proof challenge 304, such as an audio word, from the human interactive proof portal 140 for presentation to a user (Block 804). The user device 110 may present the audio word as the proof challenge 304 to the user (Block 806). The user device 110 may receive a biometric input from the user in response to the proof challenge 304. For example, the user device 110 may receive an audio input from the user in response to the proof challenge 304 (Block 808). The user device 110 may send a proof response 306 to the human interactive proof portal 140 (Block 810).

Figure 9:
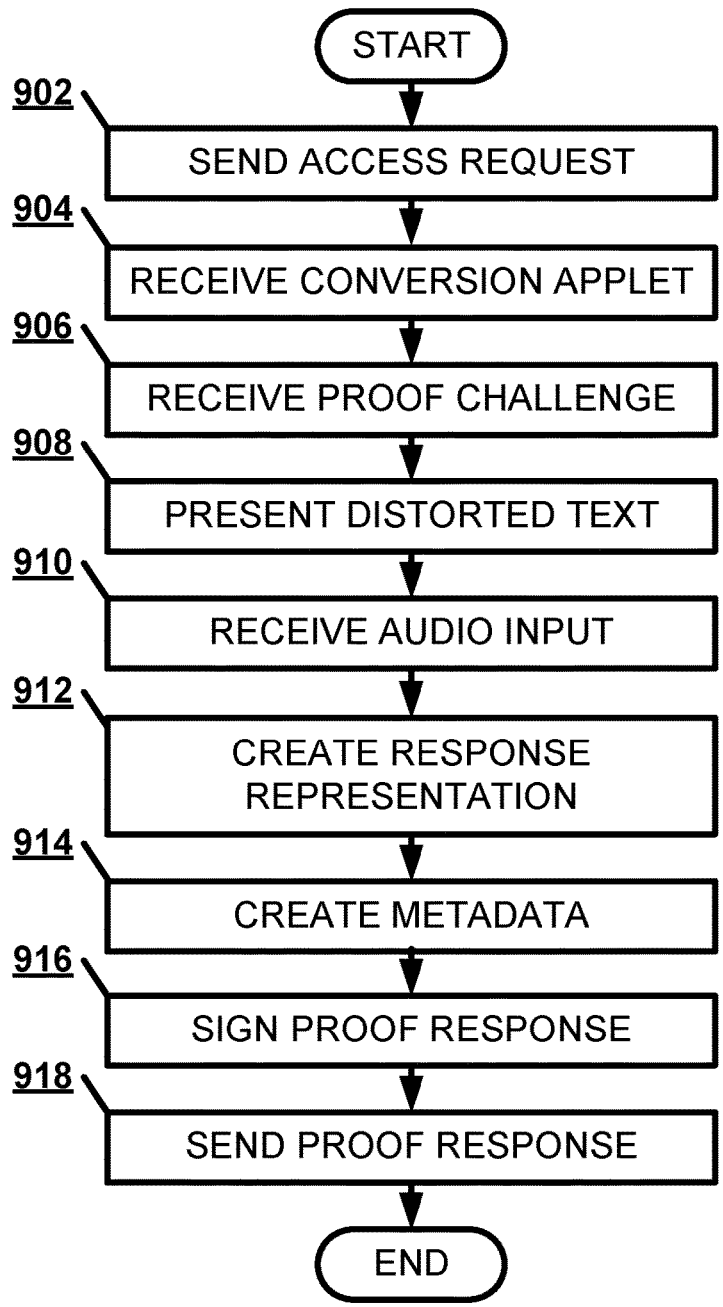
FIG. 9 illustrates, in a flowchart, one embodiment of a method for conducting a human interactive proof session with a user device having user side processing.

The user device 110 may process the biometric input prior to transmission to the human interactive proof portal 140. FIG. 9 illustrates, in a flowchart, one embodiment of a method 900 for conducting a human interactive proof session 300 with a user device 110 having user side processing. The user device 110 may send an access request 302 for an online data service 120 to a human interactive proof portal 140 (Block 902). The user device 110 may receive a conversion applet 112 for installation from the human interactive proof portal 140 (Block 904). The user device 110 may receive a proof challenge 304, such as a text segment, from the human interactive portal 140 for presentation to a user (Block 906). The user device 110 may present a text segment, such as a distorted text word, as the proof challenge 304 to the user (Block 908). The user device 110 may receive an audio input from the user in response to the proof challenge 304 (Block 910). The user device 110 may create a response representation 420, such as a text word, an audio file, or other intermediate format representations, based on the audio input (Block 912). The user device 110 may create a biometric metadata description 430 based on the audio input to be sent to the human interactive proof portal 140 (Block 914). The user device 110 may sign the proof response using the conversion applet to authenticate the proof response 400 (Block 916). The user device 110 may send a proof response 306 having the response representation 420 and the biometric metadata description 430 to the human interactive proof portal 140 (Block 918).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
receiving an access request from a user device;
sending a proof challenge to the user device for presentation to a user; and
receiving from the user device a proof response having a biometric metadata description based on a biometric input from the user, the biometric metadata description describing at least one of a tone and/or a speed of the biometric input.

2. The method of claim 1, further comprising:
sending a conversion applet for installation by the user device.

3. The method of claim 1, further comprising:
comparing the biometric input to a proof challenge answer.

4. The method of claim 1, further comprising:
receiving a response representation based on an audio input.

5. The method of claim 4, further comprising:
determining if the audio input is from a speech synthesizer.

6. The method of claim 4, further comprising:
measuring a flatness aspect of the audio input.

7. The method of claim 4, further comprising:
comparing a voice print of the audio input to a user account profile.

8. The method of claim 4, further comprising:
identifying different users for a single user account.

9. The method of claim 4, further comprising:
identifying a voice print as belonging to a frequent user.

10. The method of claim 4, further comprising:
determining if the user is at a reputable network address.

11. The method of claim 1, further comprising:
tracking a response time for the proof response.

12. The method of claim 1, further comprising:
granting access to a user account based on the biometric input.

13. The method of claim 1, further comprising:
sending a text segment as the proof challenge.

14. The method of claim 1, further comprising:
sending an audio word as the proof challenge.

15. A tangible computer-readable storage medium having a set of instructions detailing a method stored thereon that when executed by one or more processors cause the one or more processors to perform the method, the method comprising:
sending an access request to a human interactive proof portal;
receiving a proof challenge from the human interactive proof portal for presentation to a user;
receiving an audio input from the user in response to the proof challenge; and
creating a biometric metadata description based on the audio input;
wherein the biometric metadata description describes at least one of a level, a tone, and/or a speed of the audio input; and
sending to the human interactive proof portal a proof response comprising the biometric metadata description to determine whether the audio input is produced by a human or is computer generated.

16. The tangible computer-readable storage medium of claim 15, wherein the method further comprises:
presenting an audio word as the proof challenge to the user.

17. The tangible computer-readable storage medium of claim 15, wherein the method further comprises:
presenting a text segment as the proof challenge to the user.

18. The tangible computer-readable storage medium of claim 15, wherein the method further comprises:
creating a response representation based on the audio input.

19. A human interactive proof portal, comprising:
a communication interface that receives an access request from a user device; and
a processor to generate a proof challenge for presentation to a user and to examine a proof response containing a representation of a biometric input from the user and a biometric metadata description, wherein the biometric metadata description describes at least one of a level, a tone, and a speed of the biometric input, to determine whether the user is from a human sweatshop.

20. The human interactive proof portal of claim 19, wherein the processor generates a biometric proof response.

* * * * *